United States Patent
Byrnes et al.

(10) Patent No.: US 11,762,062 B2
(45) Date of Patent: Sep. 19, 2023

(54) MULTI-MODE SIGNAL LIDAR COLLECTION METHODS AND SYSTEMS

(71) Applicant: The Charles Stark Draper Laboratory, Inc., Cambridge, MA (US)

(72) Inventors: Steven J. Byrnes, Watertown, MA (US); Michael G. Moebius, Arlington, MA (US); Steven J. Spector, Lexington, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 248 days.

(21) Appl. No.: 17/308,193

(22) Filed: May 5, 2021

(65) Prior Publication Data

US 2021/0349186 A1 Nov. 11, 2021

Related U.S. Application Data

(60) Provisional application No. 63/020,131, filed on May 5, 2020.

(51) Int. Cl.
| | | |
|---|---|---|
| *G01S 7/481* | (2006.01) | |
| *G02B 6/14* | (2006.01) | |
| *G01S 17/88* | (2006.01) | |

(52) U.S. Cl.
CPC .............. *G01S 7/4811* (2013.01); *G02B 6/14* (2013.01); *G01S 17/88* (2013.01)

(58) Field of Classification Search
CPC ........ G01S 7/4811; G01S 7/88; G01S 7/4818; G01S 7/4817; G02B 6/14
See application file for complete search history.

(56) References Cited

U.S. PATENT DOCUMENTS

| 10,684,420 B2 * | 6/2020 | Spector ................. G01S 7/4814 |
| 10,739,520 B2 * | 8/2020 | Lane ...................... G01S 7/4816 |

(Continued)

FOREIGN PATENT DOCUMENTS

| CN | 104536138 A | * | 4/2015 | ......... G02B 27/0101 |
| EP | 3 588 142 A1 | | 1/2020 | |

OTHER PUBLICATIONS

European Patent Office, Extended European Search Report and Written Opinion, 21172307.7, dated Oct. 8, 2021, 8 pages.

(Continued)

*Primary Examiner* — Ryan A Lepisto
*Assistant Examiner* — Erin D Chiem
(74) *Attorney, Agent, or Firm* — George Jakobsche Patent Counsel PLLC

(57) ABSTRACT

A LiDAR system emits single mode light from a photonic integrated circuit (PIC) and is capable of receiving a different mode light, or multiple modes of light, into the PIC. Objects in the LiDAR's field of view may reflect light with a mode different from the mode of the light that illuminated the objects. Thus, in some embodiments, a single-mode optical waveguide, a single-mode-multi-mode optical junction, a multi-mode optical waveguide and an array of optical emitters on the PIC are configured to emit into free space light of a single mode from each optical emitter of the array of optical emitters. The multi-mode optical waveguide and the array of optical emitters are configured to receive from the free space light of a mode different from the single mode, or multiple modes, and to couple the light of the different mode or multiple modes into the multi-mode optical waveguide.

10 Claims, 15 Drawing Sheets

(56) References Cited

U.S. PATENT DOCUMENTS

2018/0052378 A1    2/2018  Shin et al.
2018/0172918 A1*   6/2018  Lane .................... H04J 14/022
2018/0175961 A1*   6/2018  Spector ............. H04Q 11/0003

OTHER PUBLICATIONS

Yu, et al., "Compact and Lightweight 1.5 μm lidar with a multi-mode fiber coupling free-running InGaAs/InP single-photon detector," vol. 89, Review of Scienctic Instruments, 6 pgs., Oct. 15, 2018.
Jin, et al., "A Concept of Multi-Mode High Spectral Resolution LIDAR Using Mach-Zehnder Interferometer," EPJ Web of Conferences, vol. 119, 4 pgs., Jun. 7, 2016.
Ristori, et al., "Development of a High Spectral Resolution LIDAR Using a Multi-Mode Laser and a Tunable Interferometer," EPJ Web of Conferences, vol. 119, 5 pgs., Jul. 2015.

\* cited by examiner

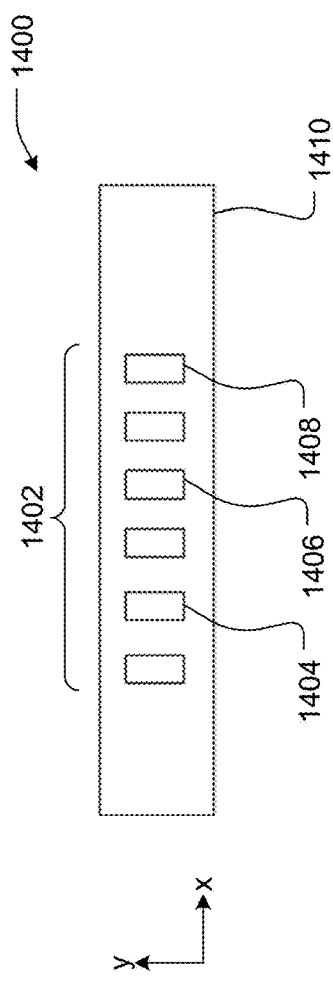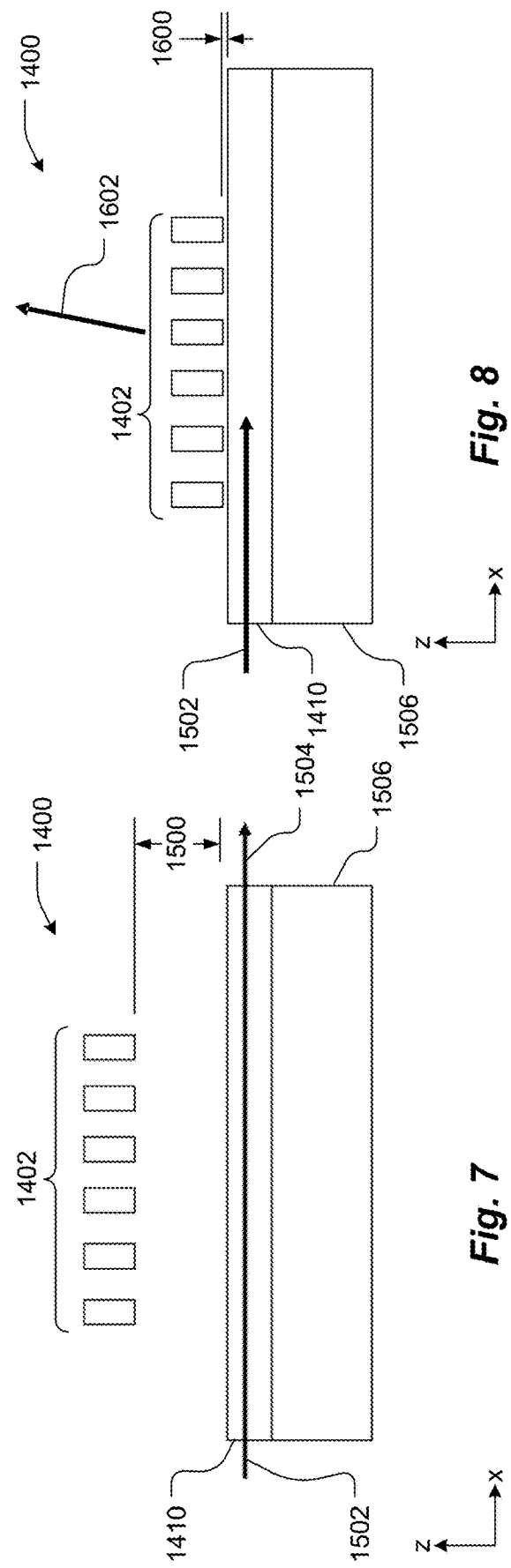

MULTI-MODE SIGNAL LIDAR COLLECTION METHODS AND SYSTEMS

CROSS-REFERENCE TO RELATED APPLICATIONS

This application claims the benefit of U.S. Provisional Patent Application No. 63/020,131, filed May 5, 2020, titled "Multi-Mode LiDAR Collection Methods and Systems," the entire contents of which are hereby incorporated by reference herein, for all purposes.

BACKGROUND

Technical Field

The present invention relates to LiDAR systems and, more particularly, to LiDAR systems that transmit light into, and receive reflected light from, a scene, where the reflected light passes through a waveguide on its way to the detector.

Related Art

A LiDAR system emits light into a scene (field of view) to scan the scene and receive light reflected from objects in the scene. Timing and direction of the reflected light enable the LiDAR system to automatically ascertain locations of the objects and, in some cases, identify or classify the objects. However, light reflected from some objects may not be spatially coherent even if the emitted light is spatially coherent.

Certain LiDAR systems, including some of our previously described LiDAR systems, entail collecting light into a single-mode waveguide. This can lead to a reduction in light collection efficiency, i.e., only a subset of returning photons that pass through an aperture of the LiDAR system is successively conveyed back into the waveguide. The reduction is particularly severe if the outgoing light is not focused into a near-diffraction-limited spot in the far field. However, the reduction also occurs even if the light is so focused.

SUMMARY OF EMBODIMENTS

An embodiment of the present invention provides a LiDAR system. The LiDAR system has a field of view. The LiDAR system includes a laser, a single-mode optical waveguide, a multi-mode optical waveguide, a single-mode-multi-mode optical junction and an array of optical emitters. The array of optical emitters is optically coupled to, and disposed along, the multi-mode optical waveguide. An objective lens optically couples each optical emitter of the array of optical emitters to a respective unique portion of the field of view.

An optical switching network is coupled, via the single-mode optical waveguide and the single-mode-multi-mode optical junction, between the laser and the multi-mode optical waveguide. A controller is coupled to the optical switching network. The controller is configured to cause the optical switching network to route light from the laser to a sequence of optical emitters of the array of optical emitters according to a temporal pattern.

An optical receiver is coupled to the optical switching network. The optical receiver is configured to receive light returned from the field of view.

The single-mode optical waveguide, the single-mode-multi-mode optical junction, the multi-mode optical waveguide and the array of optical emitters are configured to emit into free space light of a single mode from each optical emitter of the array of optical emitters. The multi-mode optical waveguide and the array of optical emitters are configured to receive from the free space, by each optical emitter of the array of optical emitters, light of a mode different from the single mode. The multi-mode optical waveguide and the array of optical emitters are also configured to couple the light of the different mode into the multi-mode optical waveguide.

Optionally, the multi-mode optical waveguide and the array of optical emitters are configured to receive, by each optical emitter of the array of optical emitters, light of a plurality of modes, each different from the first mode. The multi-mode optical waveguide and the array of optical emitters may also be configured to receive and couple the light of the plurality of modes into the multi-mode optical waveguide.

Optionally, in any embodiment, the single-mode-multi-mode optical junction includes a first optical waveguide that defines a first optical port and a common optical port. The first optical waveguide may be capable of conducting multiple modes of light. The first optical waveguide may have a first index of refraction. A second optical waveguide may define a second optical port. The second optical waveguide may be capable of conducting multiple modes of light. The second optical waveguide may have a second index of refraction different from the first index of refraction. The first optical waveguide may be optically coupled to the second optical waveguide along a diagonal boundary. The first optical waveguide may be configured to adiabatically transition single-mode light entering the first optical port as the single-mode light spreads and enters the first optical waveguide toward the common optical port, such that the single-mode light remains in a fundamental mode.

Optionally, in any embodiment, the single-mode-multi-mode optical junction includes a first single mode optical waveguide that has a proximal end and a distal end. The proximal end defines a first optical port. The first optical waveguide has a first index of refraction. A second optical waveguide has an outer boundary. The second optical waveguide defines a second optical port. The second optical waveguide is capable of conducting multiple modes of light. The second optical waveguide has a second index of refraction. The second index of refraction is different from the first index of refraction. The proximal end of the first optical waveguide is disposed outside the outer boundary of the second optical waveguide. The distal end of the first optical waveguide is disposed within the outer boundary of the second optical waveguide.

Optionally, in any embodiment, the single-mode-multi-mode optical junction includes a first single mode optical waveguide that has a proximal end, a distal end and a first index of refraction. The proximal end defines a first optical port. The distal end is tapered in width. A second optical waveguide has an outer surface. The second optical waveguide defines a second optical port and a common optical port. The second optical waveguide is capable of conducting multiple modes of light. The second optical waveguide has a second index of refraction. The second index of refraction is different from the first index of refraction. A distal portion of the first optical waveguide is disposed on the outer surface of the second optical waveguide. The distal portion of the first optical waveguide is disposed between the second optical port and the common optical port. Contact area between the first optical waveguide and the second optical waveguide tapers in a narrowing manner toward the distal end of the first optical waveguide.

Optionally, in any embodiment, the first index of refraction is greater than the second index of refraction.

Optionally, in any embodiment, for each optical emitter of the array of optical emitters, a first portion of the optical emitter is configured to effectively optically couple light in the free space and light traveling in a first direction through the multi-mode optical waveguide. For each optical emitter of the array of optical emitters, a second portion of the optical emitter is configured to effectively optically couple light in the free space and light traveling in a direction opposite the first direction through the multi-mode optical waveguide. The LiDAR system also may include a mirror. The mirror may be optically coupled to the multi-mode optical waveguide. The mirror may be configured to reflect the light traveling in the first direction through the multi-mode optical waveguide toward the optical receiver.

Another embodiment of the present invention provides a LiDAR system. The LiDAR system has a field of view. The LiDAR system includes a laser, a single-mode optical waveguide and a first array of optical emitters. The first array of optical emitters is optically coupled to, and disposed along, the single-mode optical waveguide. A first objective lens optically couples each optical emitter of the first array of optical emitters to a respective unique destination portion of the field of view. A first optical switching network is optically coupled between the laser and the first array of optical emitters.

The LiDAR also includes a multi-mode optical waveguide and a second array of optical emitters. The second array of optical emitters is optically coupled to, and disposed along, the multi-mode optical waveguide. A second objective lens optically couples each optical emitter of the second array of optical emitters to a respective unique return portion of the field of view. Each return portion of the field of view corresponds to a respective destination portion of the field of view.

An optical receiver is configured to receive light from the field of view. A second optical switching network is coupled between the second array of optical emitters and the optical receiver.

A controller is coupled to the first and second optical switching networks. The controller is configured to cause the first optical switching network to route light from the laser to a sequence of optical emitters of the first array of optical emitters according to a temporal pattern. The controller is also configured to cause the second optical switching network to route light from a sequence of optical emitters of the second array of optical emitters to the optical receiver according to the temporal pattern.

The single-mode optical waveguide and the first array of optical emitters are configured to emit into free space light of a single mode from each optical emitter of the first array of optical emitters. The multi-mode optical waveguide and the second array of optical emitters are configured to receive from the free space, by each optical emitter of the second array of optical emitters, light of a mode different from the single mode. The multi-mode optical waveguide and the second array of optical emitters are also configured to couple the light of the different mode into the multi-mode optical waveguide.

Optionally, in any embodiment, the multi-mode optical waveguide and the second array of optical emitters are configured to receive, by each optical emitter of the second array of optical emitters, light of a plurality of modes, each different from the single mode. The multi-mode optical waveguide and the second array of optical emitters are also configured to couple the light of the plurality of modes into the multi-mode optical waveguide.

Optionally, in any embodiment, the first objective lens and the second objective lens are implemented by a single objective lens. In other embodiments, the first objective lens and the second objective lens are implemented by separate lenses.

BRIEF DESCRIPTION OF THE DRAWINGS

The invention will be more fully understood by referring to the following Detailed Description of Specific Embodiments in conjunction with the Drawings, of which:

FIG. 6 is a schematic top view of a binary optical switch of the optical switch network of FIG. 4, according to an embodiment of the present invention.

FIG. 7 is a schematic side view of the binary optical switch of FIG. 6 in the OFF position, and FIG. 8 is a schematic side view of the binary optical switch of FIG. 6 in the ON position, according to an embodiment of the present invention.

DETAILED DESCRIPTION OF SPECIFIC EMBODIMENTS

Embodiments of the present invention provide LiDAR systems that emit one mode of light and are capable of receiving reflected light, even if the reflected light has a propagating mode different from the emitted light.

Embodiments of the present invention provide LiDAR systems that can be configured to emit one or more beams to scan a scene (field of view). An exemplary LiDAR system includes an optical circuit that includes a photonic integrated circuit (PIC), lens, laser(s), detector(s) and control electronics. The optical circuit functions as follows: Light from the laser is coupled into the PIC, where a series of two MEMS switches defines where on the PIC the light is emitted. The first MEMS switch may include a MEMS switchable overpass waveguide that couples light from a bus waveguide to a row of grating switches; an alternative design can be configured by connecting each row of grating switches to its own laser and detector. In each grating switch, a MEMS device moves a grating in proximity to the waveguide to couple light out into free space. In any case, the light is emitted through the surface of the PIC into free space, as opposed to being totally internally reflected and remaining within the thickness of the PIC as in U.S. Pat. Publ. No. 2002/0048423 to Frick, et al. The objective lens then directs the light to a specific point in the scene, based on where on the PIC the light is emitted from.

Reflected light from the scene is collected by the objective lens and coupled back onto the PIC. The signal is then coupled from the PIC into the detector. Each grating switch thus forms an optical emitter. Collectively, the grating switches form an array of optical emitters. Each optical emitter also receives reflected light. Each optical emitter can be considered to represent one pixel of the field of view of the LiDAR system.

Collectively, the MEMS switches form an optical switching network that, under control of a controller, controls routing of the light from the laser to a sequence of optical emitters of the array of optical emitters, and routing of light received from the scene by the sequence of optical emitters to the detector, according to a temporal pattern.

The PIC and other aspects of the LiDAR are described in U.S. patent application Ser. No. 15/844,527, titled "Integrated MEMS Switches for Selectively Coupling Light in and out of a Waveguide," filed Dec. 16, 2017 and published as U.S. Pat. Publ. No. 2018/0175961 on Jun. 21, 2018 (now U.S. Pat. No. 10,473,862) and U.S. patent application Ser. No. 16/002,882, titled "Integrated MEMS Switches for Selectively Coupling Light in and out of a Waveguide," filed Jun. 7, 2018, (now U.S. Pat. No. 10,466,423), the entire contents of each of which are hereby incorporated by reference herein, for all purposes.

Figure 1:
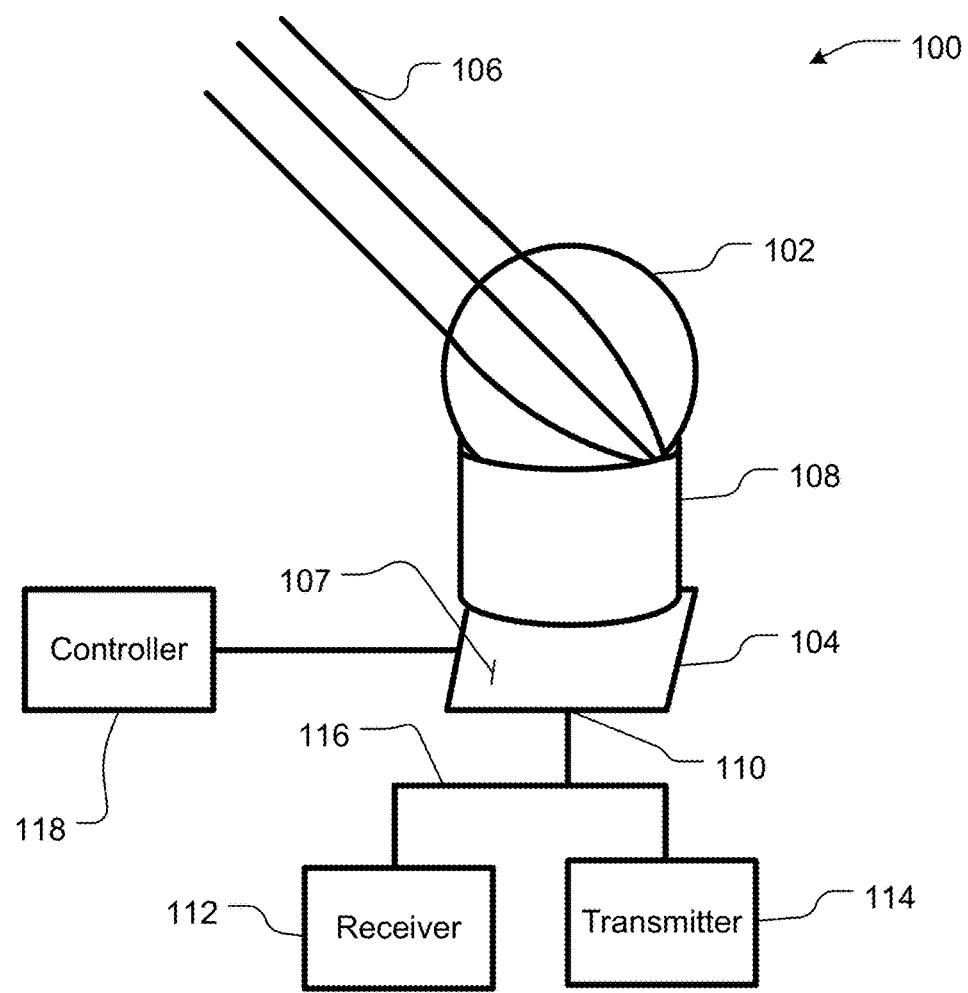
FIG. 1 is a schematic illustration of an optical transmit/receive terminal, according to an embodiment of the present invention.

FIG. 1 is a partially schematic illustration of an optical transmit/receive terminal 100, according to an embodiment of the present invention. A lens 102 is optically coupled to an optical switch network 104 (also referred to herein as an "optical waveguide network" or an "optical switch"), such that incoming light rays, represented by light rays 106, are focused on a surface 107 of the optical switch network 104. Conversely, optical signals emitted at the surface 107 of the optical switch network 104 are optically coupled to the lens and, thereby, projected into space as light rays 106. The light may be humanly visible or invisible, such as infrared (IR), light. The surface 107 may be a planar surface or a non-planar surface.

The lens 102 is preferably a wide field-of-view lens. The lens 102 may, for example, be a gradient index (GRIN) lens, fisheye lens or monocentric lens. A suitable monocentric lens is available from Distant Focus Corporation, PO Box 7857, Champaign, IL 61826-7857. If the lens creates a planar focused image, the lens 102 and the optical switch network 104 may be optically coupled by air or a vacuum 108. However, if the lens creates a curved focused image, a bundle of optical fibers 108 may be used to optically couple the lens 102 to the optical switch network 104. One end of each optical fiber of the bundle of optical fibers 108 may terminate on the surface of the lens 102, and the other end of the optical fiber may terminate on the surface 107 of the optical switch network 104. The ends of the optical fibers 108 that terminate on the surface of the lens 102 may have polished ends, forming curved surfaces that match curvature of the lens 102.

Figure 2:
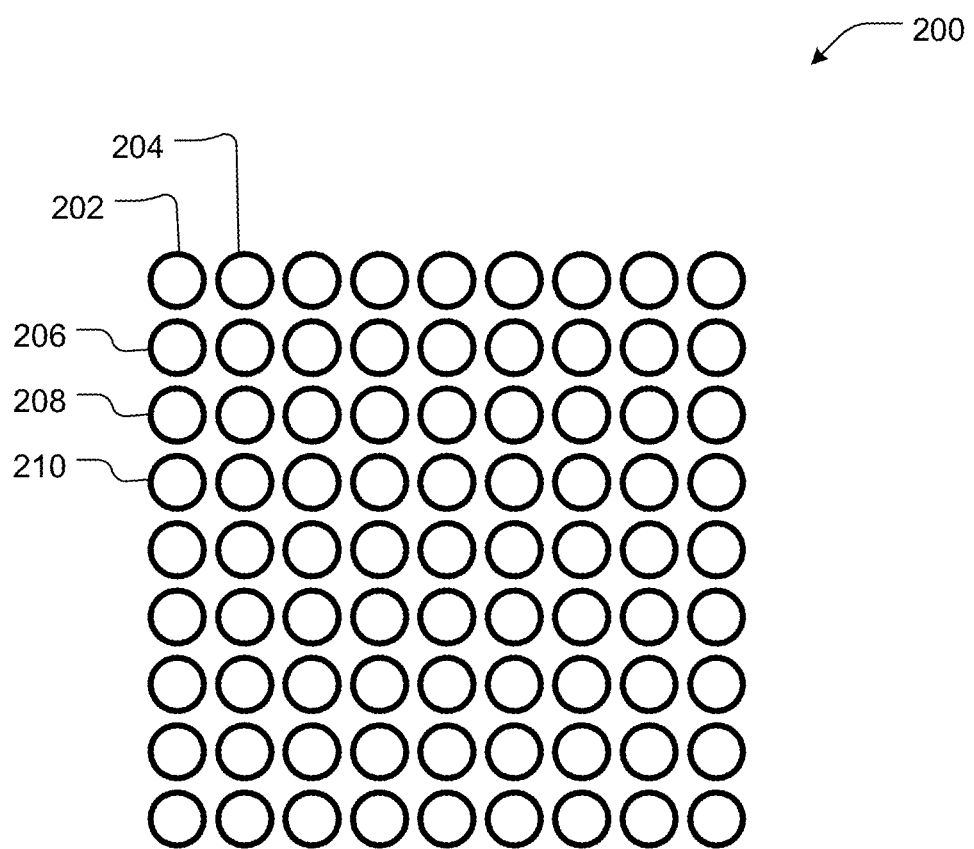
FIG. 2 is a schematic diagram illustrating a plurality of ports on a surface of an optical switch network of the optical transmit/receive terminal of FIG. 1, according to an embodiment of the present invention.

FIG. 2 is a schematic diagram illustrating a plurality of N ports 200, represented by ports 202, 204, 206, 208 and 210, on the surface 107 of the optical switch network 104 of FIG. 1. The plurality of ports 200 is shown as being arranged in a rectangular array. However, the ports 200 may be arranged in any suitable arrangement. If optical fibers 108 (FIG. 1) are used to couple the lens 102 to the optical switch network 104, one or more optical fibers 108 may terminate at each port 202-210. The optical fibers 108 should be arranged so the image projected by the lens 102 is mapped to corresponding locations within the plurality of ports 200. Thus, each port 202-210 corresponds to a unique portion of the field of view of the lens 102.

Returning to FIG. 1, the optical switch network 104 also has a common input/output port 110. The optical switch network 104 is configured to selectively optically couple one or more of the N ports 202-210 (FIG. 2) on the surface 107 to the common input/output port 110. Thus, in one mode, the optical switch network 104 acts as an N×1 switch. That is, one of the N ports 202-210 is coupled to the common input/output port 110. Optionally, in other modes, the optical switch network 104 acts as a plurality of N×1 switches. That is, a plurality of the N ports 202-210 are simultaneously coupled to the common input/output port 110.

The terminal 100 also includes a suitable optical receiver 112, such as a photo diode, and/or a suitable transmitter 114, such as a laser. A LiDAR system or a two-way communication system includes both the transmitter 114 and the receiver 112. However, a one-way communication system need to include only the transmitter 114 or the receiver 112, and a star tracker needs to include only the receiver 112. The receiver 112 and/or transmitter 114 are optically coupled to the common input/output port 110 by suitable optical couplings, represented by optical coupling 116, such as optical fibers, mirrors and/or splitters/combiners.

Thus, an optical signal from the transmitter 114 may be routed via the optical coupling 116 to the optical switch network 104 and there switched to a selected one or more of the N ports 202-210. Once emitted from the surface 107 of the optical switch 107, the optical signal is conveyed to the lens 102, such as via the optical fiber(s) 108 terminated at the selected port(s) 202-210, and then by the lens 102 into space. A direction in space, in which the optical signal is projected by the lens 102, depends on which port(s) 202-210 is(are) selected. Conversely, an optical signal received by the lens 102, such as a return signal in a LiDAR system, is routed by the optical switch network 104 to the receiver 112. A direction in space, from which the optical signal is received by the lens 102, depends on which port 202-210 is selected.

Figure 3:
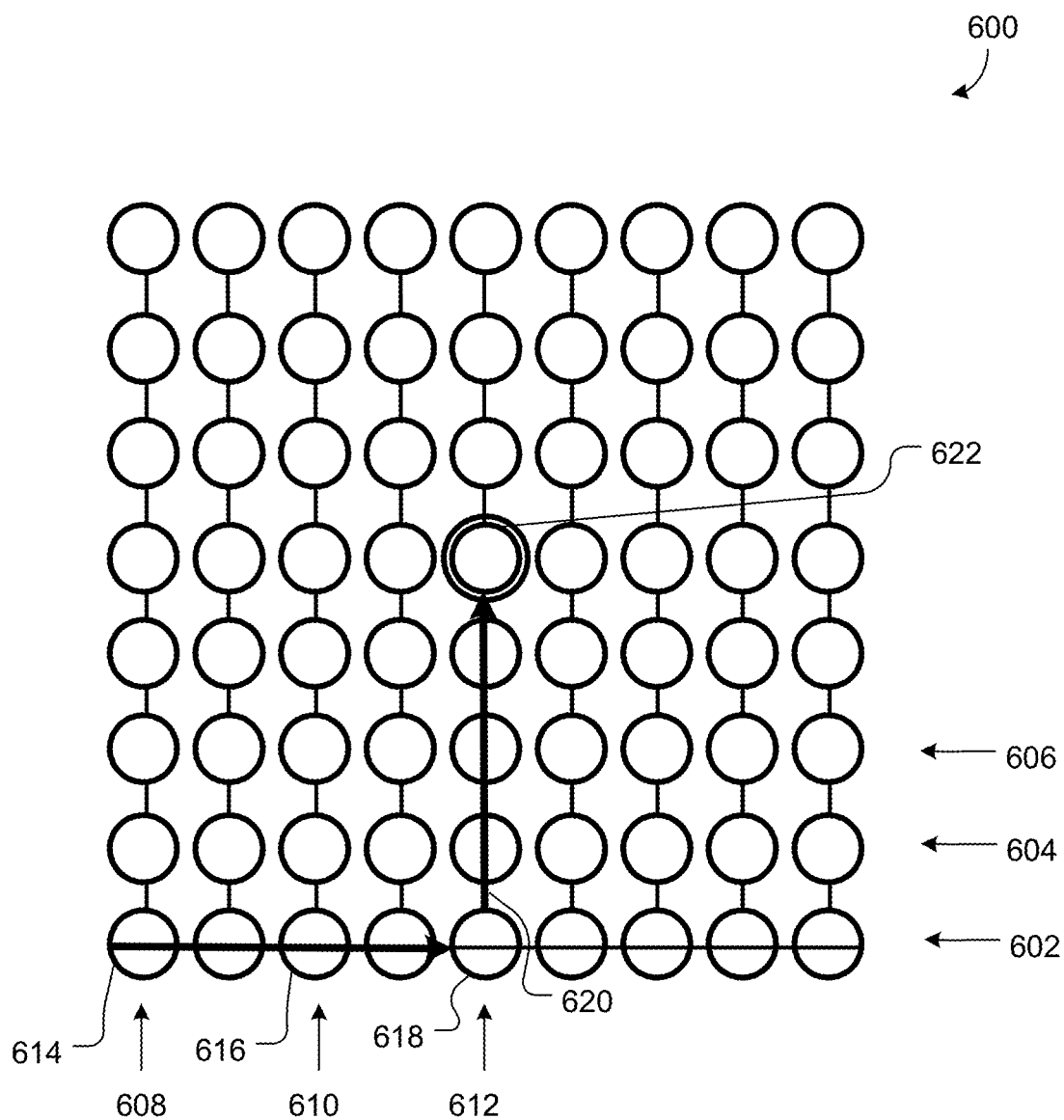
FIG. 3 is a schematic diagram illustrating a means to address a port of the plurality of ports of FIG. 2 on the surface of the optical switch network, i.e., by a row/column addressing matrix, according to an embodiment of the present invention.

A suitable row and column addressing matrix 600 is shown schematically in FIG. 3, although for simplicity, the matrix 600 is shown as a square matrix. Rows of the matrix 600 are exemplified by rows 602, 604 and 606, and columns of the matrix 600 are exemplified by columns 608, 610 and 612. Respective transistors, represented by transistors 614, 616 and 618, in the first row 602 selectively electrically couple the first row 602 to the columns 608-612. A voltage is applied to the first row 602, thereby making a current available to flow in the first row 602. Thus, a first-row transistor, such as transistor 618 that is ON, as indicated by a surrounding circle, directs current to a selected column, in this case column 612, as shown by a heavy arrow 620.

In each column, respective transistors couple the column to corresponding binary optical switches (not shown in FIG. 3). A transistor in the powered column 612, such as transistor 622, that is ON, as indicated by a surrounding circle, is electrically coupled, and directs current, to its corresponding binary optical switch, thereby activating the binary optical switch.

Alternatively, for ease of addressing, a whole row 602-606 of transistors can be turned on at the same time, without affecting the device operation, other than the extra power used to turn on the extra transistors. The transistors can be activated directly or by use of a shift-operator, for example.

Returning to FIG. 1, the lens 102 allows for a very large effective aperture area by decoupling the size of the aperture from the number of phase shift elements, and thus power consumption, of the all-solid state optical transmit/receive terminal 100.

Figure 4:
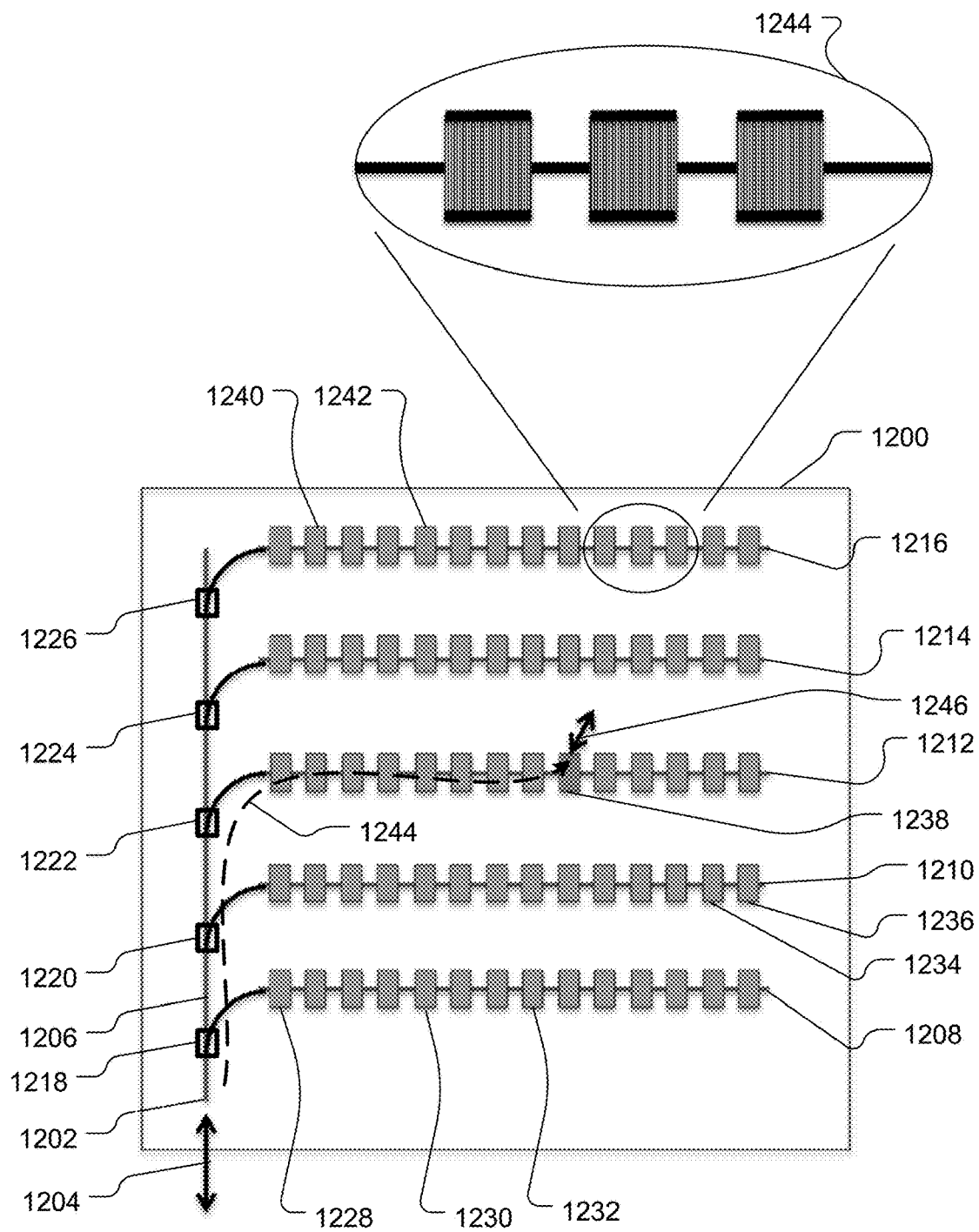
FIG. 4 is a schematic diagram illustrating an optical switch network that may be used in the optical switch network of FIGS. 1-2, according to an embodiment of the present invention.

Limitations on the densities at which the binary optical switches may be fabricated may limit spatial resolution of the transmit/receive terminal 100, i.e., density of possible transmit or receive beam positions. FIG. 4 is a partially schematic diagram illustrating an optical switch network 1200 that may be used as the optical switch network 104 (FIG. 1), according to an embodiment of the present invention. In this embodiment, an optical switch network employs MEMS-based binary optical switches to steer an optical beam.

The MEMS-based binary optical switches may be significantly smaller than an H-tree based binary optical switch. Consequently, the MEMS-based binary optical switches may be fabricated or packed at a high density, providing high spatial resolution of a transmit/receive terminal, i.e., density of possible transmit/receive beam positions. In the optical transmit/receive terminal 100, a relatively small subset of the MEMS-based switches needs to be operated, therefore powered, at any given time. Therefore, a terminal that includes the optical switch network 1200 overcomes the mechanical, switch density, emitter density and high power problems associated with the prior art.

The optical switch network 1200 includes a common input/output port 1202. Light may enter and/or exit the common input/output port 1202, as indicated by a double-headed arrow 1204. The common input/output port 1202 is optically coupled to a first optical waveguide 1206. The optical switch network 1200 also includes a plurality of second optical waveguides, represented by optical waveguides 1208, 1210, 1212, 1214 and 1216. Each second optical waveguide 1208-1216 is optically coupled to the first optical waveguide 1206 via a respective first binary optical switch, represented by first binary optical switches 1218, 1220, 1222, 1224 and 1226.

In some embodiments, each first binary optical switch 1218-1226 acts as a single-pole, double-throw (SPDT) switch. Thus, assuming light enters the common input/output port 1202, the first binary optical switch 1218 selectively either allows the light to continue along the first optical waveguide 1206 or diverts the light to the second optical waveguide 1208, but not both. Thus, collectively, the first binary optical switches 1218-1226 control to which second optical waveguide 1208-1216 the light is diverted. Similarly, collectively the first binary optical switches 1218-1226 control from which second optical waveguide 1208-1216 light is routed to the first optical waveguide 1206 and, thence, to the common input/output port 1202, in a receive mode. Although five second optical waveguides 1208-1216 and five first binary optical switches 1218-1226 are shown, any suitable number of second waveguides 1208-1216 and first binary optical switches 1218-1226 may be included.

A respective plurality of second binary optical switches, represented by second binary optical switches 1228, 1230, 1232, 1234, 1236, 1238, 1240 and 1242, is optically coupled to each second optical waveguide 1208-1216. For example, second binary optical switches 1228-1232 are optically coupled to the second optical waveguide 1208. Each second binary optical switch 1228-1242 may selectively optically couple the respective second optical waveguide 1208, 1210, 1212, 1214 or 1216 to free space, i.e. space above the surface of the optical switch network 1200. The second binary optical switches 1228-1242 may be coupled between the second optical waveguides 1208-1216 and the N ports 202-210 (FIG. 2), or each second binary optical switch 1228-1242 may form part or all of one of the N ports 202-210.

In some embodiments, each second binary optical switch 1228-1242 acts as a single-pole, double-throw (SPDT) switch. Thus, assuming light enters the common input/output port 1202 and is routed by the first binary optical switch 1222 to the second optical waveguide 1212, as indicated by a dashed line 1244, the second binary optical switch 1238 selectively either allows the light to continue along the second optical waveguide 1212 or diverts the light out of the second optical waveguide 1212, as indicated by a two-headed arrow 1246. The two-headed arrow 1246 extends out of the plane of the drawing. Thus, collectively, the second binary optical switches 1228-1242 control to which port of the N ports 202-210 the light is diverted. Similarly, collectively, the second binary optical switches 1228-1242 control from which port of the N ports 202-210 light is routed to the first optical waveguide 1206 and, thence, to the common input/output port 1202 in the receive mode.

Although 14 second binary optical switches are shown coupled to each second optical waveguide 1208-1216, any number of second binary optical switches may be included. All the second optical waveguides 322-1242 need not have equal numbers of second binary optical switches 1228-1242.

Each first and second binary optical switch 1218-1226 and 1228-1242 is binary, i.e., an ON-OFF or other switch having exactly two positions or states. Thus, the first and second binary optical switches 1218-1226 and 1228-1242 determine an optical route for an optical signal traveling through the switch array 1200, between the common input/output port 1202 and a selected port of the N ports 202-210, for example as exemplified by the dashed line 1244.

Figure 5:
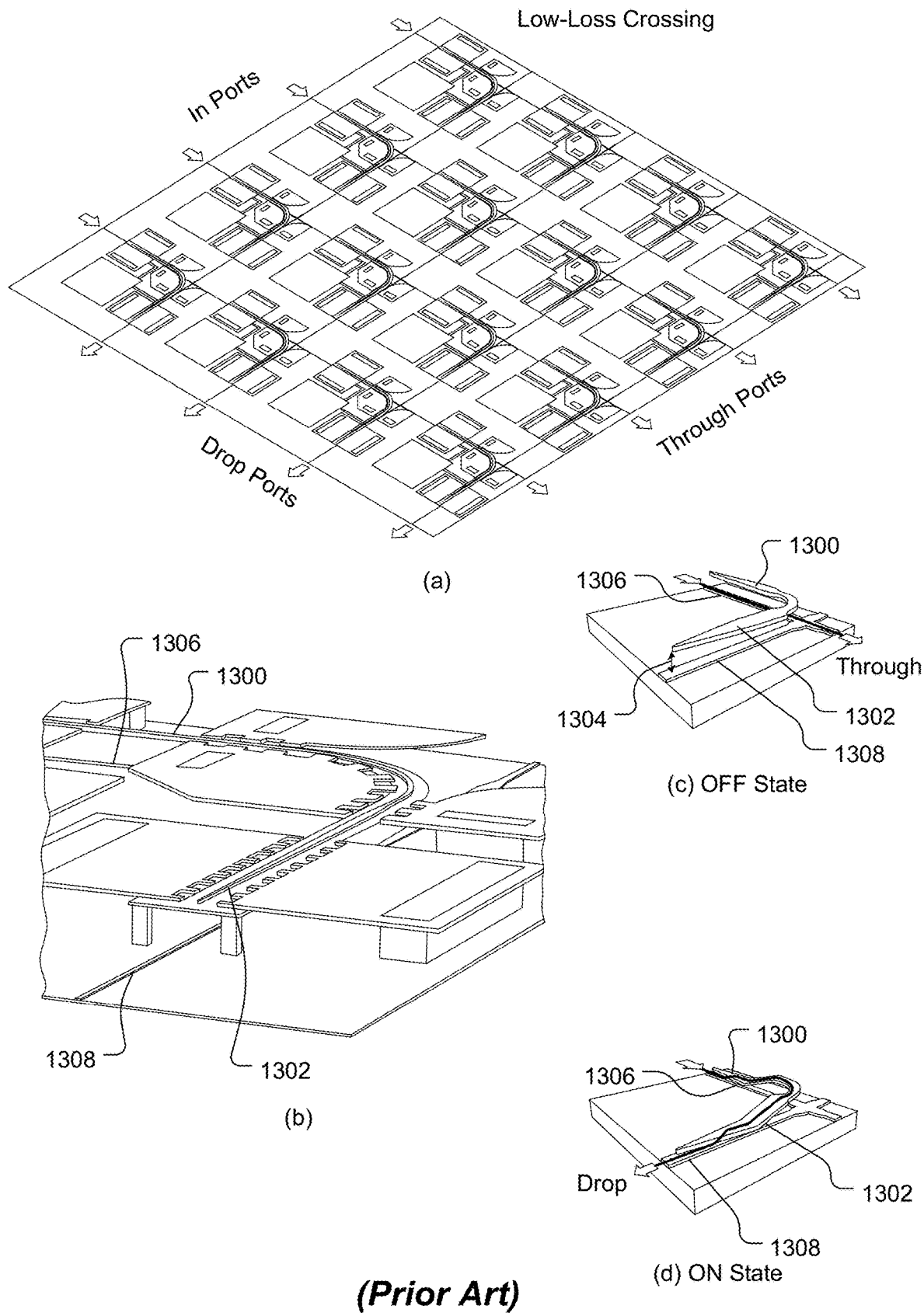
FIG. 5 is an annotated reproduction of a diagram from Seok, according to the prior art.

Each first binary optical switch 1218-1226 may be implemented by any suitable optical switch. In some embodiments, each first binary optical switch 1218-1226 is implemented by a pair of MEMS-actuated adiabatic optical couplers. Such a switch cell is described in Tae Joon Seok, et al., "Large-scale broadband digital silicon photonic switches with vertical adiabatic couplers," Optica, Vol. 3, No. 1, pp. 64-70, January, 2016, ("Seok") and Tae Joon Seok, et al., "Large-scale broadband digital silicon photonic switches with vertical adiabatic couplers: supplemental material," ("Seok supplement"), the entire contents of which are hereby incorporated by reference herein, for all purposes. Each first binary optical switch 1218-1226 may be implemented using two optical waveguides. However, unlike what is described in Seok, the two waveguides need not cross, but the principal of the switch is similar. A switching element that includes a pair of MEMS-actuated adiabatic couplers may be disposed optically between the two optical waveguides. See, for example, Seok, FIG. 1 (reproduced in the present application, with annotations, as FIG. 5).

In an OFF state (FIG. 5c), the adiabatic couplers, exemplified by adiabatic couplers 1300 and 1302, are located far enough 1304, such as about 1 μm above, the optical waveguides, exemplified by optical waveguides 1306 and 1308, so light continues to propagate along one of the waveguides 1306 (as indicated by "Through"), without appreciably coupling to the other waveguide 1308. However, in the ON state (FIG. 5d), the adiabatic couplers 1300 and 1302 are physically moved toward the waveguides 1306 and 1308 by MEMS electrostatic gap-closing actuators, and light is therefore efficiently coupled from one of the waveguides 1306 into one of the adiabatic couplers 1300, and between the other adiabatic coupler 1302 and the other waveguide 1308 (as indicated by "Drop").

Alternatively, each first binary optical switch 1218-1226 (FIG. 4) may be implemented using a standard Mach-Zehnder interferometer type switch, for example with thermal phase shifters.

As noted, the surface 107 (FIG. 1) of the optical switch network 104 has N ports 202-210, and the lens 102 focuses incoming light rays 106 onto the N ports 202-210, and/or the lens 102 projects optical signals emitted via any subset of the N ports 202-210 into space. Optical gratings are efficient devices for emitting light out of the plane of the second optical waveguides 1208-1216 or coupling out-of-plane light into the second optical waveguides 1208-1216, as indicated by the two-headed arrow 1246 (FIG. 4). An optical grating is a spatially periodic structure that defines a plurality of regions having a first refractive index, interspersed with regions having a different second refractive index. The spatial period is selected based on the wavelength of interest. In some cases, periodic grooves are defined in a material. In other cases, two different materials, having different refractive indexes, are alternated. For simplicity of explanation, the term "groove" is used herein to represent an actual groove, i.e., void, or one of the two alternating materials of an optical grating.

Such optical gratings may be disposed at or near the surface 107 (FIG. 1). Each second binary optical switch 1228-1242 (FIG. 4) may include such an optical grating. In particular, each second binary optical switch 1228-1242 may be implemented by a physically translatable optical grating, i.e., an optical grating that is configured to physically translate between at least two positions. In a first ("ON") position, the optical grating is sufficiently close to one of the second optical waveguides 1208-1216 to optically couple with the second optical waveguide with a coupling efficiency, at a wavelength of interest, of at least about 25%. In a second ("OFF") position, the optical grating is sufficiently far from the second optical waveguide to optically couple with the second optical waveguide with a coupling efficiency, at the wavelength of interest, of at most about 5%, preferably less than 1%. FIG. 4 shows three of the second binary optical switches 1228-1242 enlarged at 1244.

Each second binary optical switch 1228-1242 may include a MEMS structure that is configured to selectively translate the translatable optical grating to the ON position and to the OFF position. FIG. 6 is a partially schematic top view of one binary optical switch 1400 of the second binary optical switches 1228-1242. The binary optical switch 1400 includes a translatable grating 1402. The translatable grating 1402 defines a plurality of parallel or approximately parallel periodic grooves. The grooves are separated by walls, represented by walls 1404, 1406 and 1408. As noted, the grooves and walls may be implemented by respective materials having different refractive indexes. The walls 1404-1408 may be made of silicon, silicon nitride or another suitable material using conventional semiconductor fabrication techniques. The grooves may be voids or made of a suitable material different from the walls 1404-1408. Although the translatable grating 1402 is shown with six walls 1404-1408, any suitable number of walls and/or grooves may be used. The translatable grating 1402 is disposed above a second optical waveguide 1410, one of the second optical waveguides 1208-1216 (FIG. 4).

FIG. 7 is a partially schematic side view of the binary optical switch 1400 in the OFF position. In the OFF position, the translatable optical grating 1402 is disposed a distance 1500 from the second optical waveguide 1410 sufficient to optically couple with the second optical waveguide 1410 with a coupling efficiency of at most about 5%, preferably less than 1%, and in some embodiments less than 0.1%. In some embodiments, the distance 1500 is about 1 μm (1,000 nm). In some embodiments, the distance 1500 may be about 800 nm. In some embodiments, the distance 1500 may be about 250 nm. In the OFF position, most or substantially all light 1502 in the second optical waveguide 1410 continues along the second optical waveguide 1410, as indicated by an arrow 1504. Similarly, very little or substantially no light from free space couples via the optical grating 1402 into the second optical waveguide 1410.

The second optical waveguide 1410 may be fabricated using conventional semiconductor fabrication techniques on a suitable semiconductor wafer, such as a silicon or silicon nitride wafer. The second optical waveguide 1410 may be fabricated on a suitable oxide or other passivation layer 1506.

FIG. 8 is a partially schematic side view of the binary optical switch 1400 in the ON position. In the ON position, the translatable optical grating 1402 is disposed a distance 1600 from the second optical waveguide 1410 sufficient to optically couple with the second optical waveguide 1410 with a coupling efficiency of at least about 25%. In some embodiments, the distance 1600 is about 10-50 nm. In the ON position, much, most or substantially all light 1502 in the second optical waveguide 1410 is emitted by the translatable optical grating 1402 into free space, as indicated by an arrow 1602. Similarly, much, most or substantially all light of a suitable mode from free space couples via the optical grating 1402 into the second optical waveguide 1410.

Figure 9:
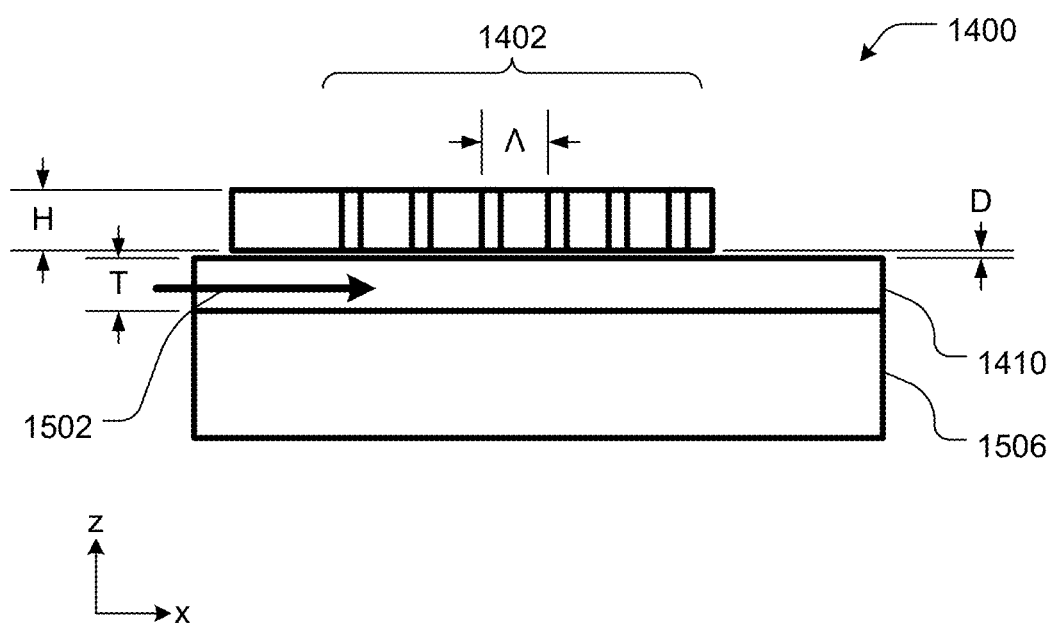
FIG. 9 is another schematic side view of the binary optical switch of FIG. 6 in the ON position showing representative dimensions, according to an embodiment of the present invention.

FIG. 9 is another partially schematic side view of the binary optical switch 1400 in the ON position showing representative dimensions, according to an embodiment of the present invention. The translatable grating 1402 is disposed a distance (D) about 20 nm from the second optical waveguide 1410. The second optical waveguide 1410 is about 150 nm thick (T) silicon on an oxide substrate 1506. The input light beam 1502 is a Gaussian with an about 2.5 µm radius. The translatable grating 1402 is about 50 nm thick (H). The translatable grating 1402 has a groove period (Λ) of about 580 nm. Appropriate modifications may be made, such as changing the groove period (Λ) for other wavelengths of light, as would be known by one of ordinary skill in the art.

Figure 10:
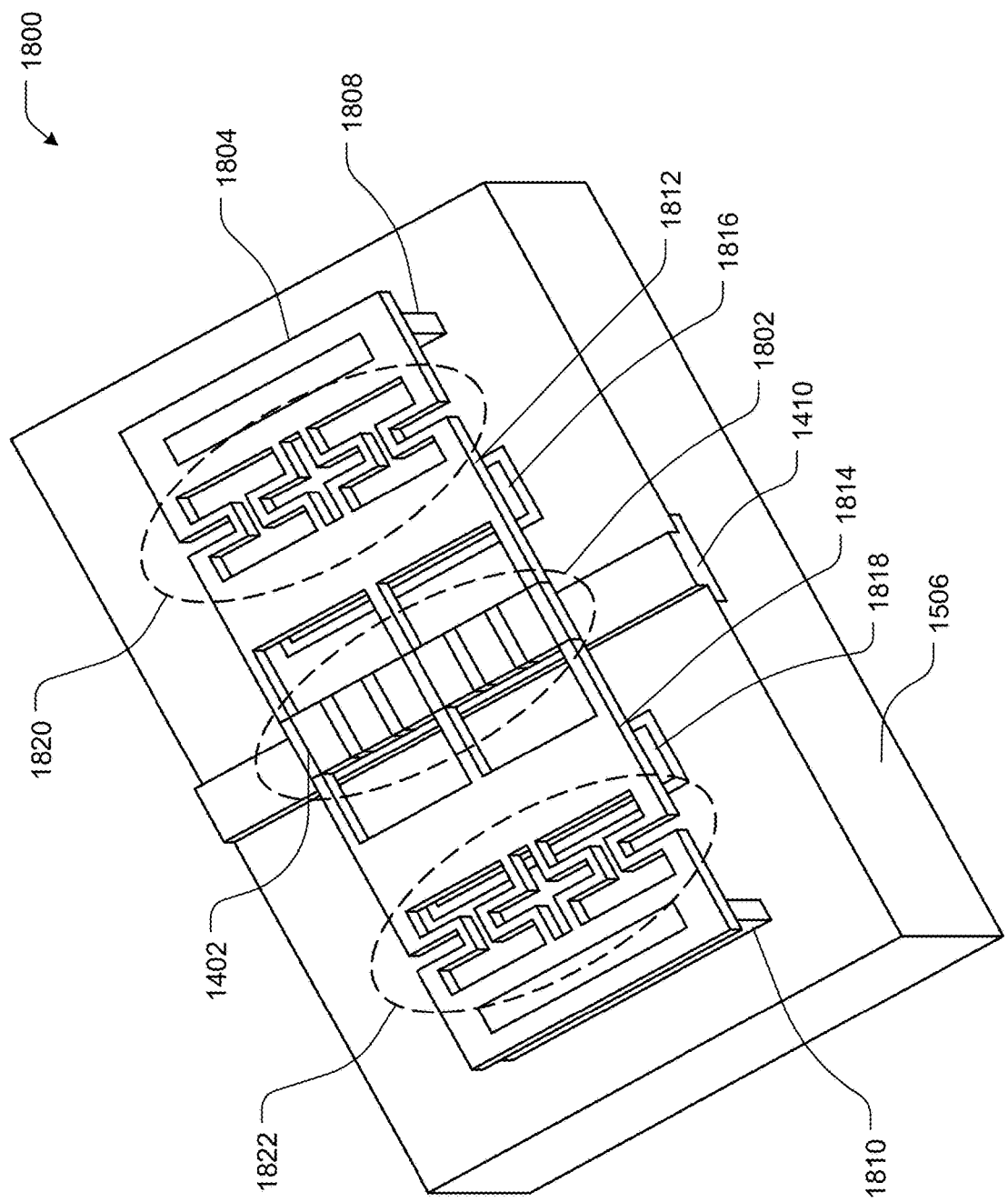
FIGS. 10 and 11 are respective schematic perspective and side views of the optical switch of FIGS. 6-9 in the OFF position, showing an electrostatic MEMS structure configured to selectively translate a translatable optical grating to the ON position and to the OFF position, according to an embodiment of the present invention.
Figure 11:
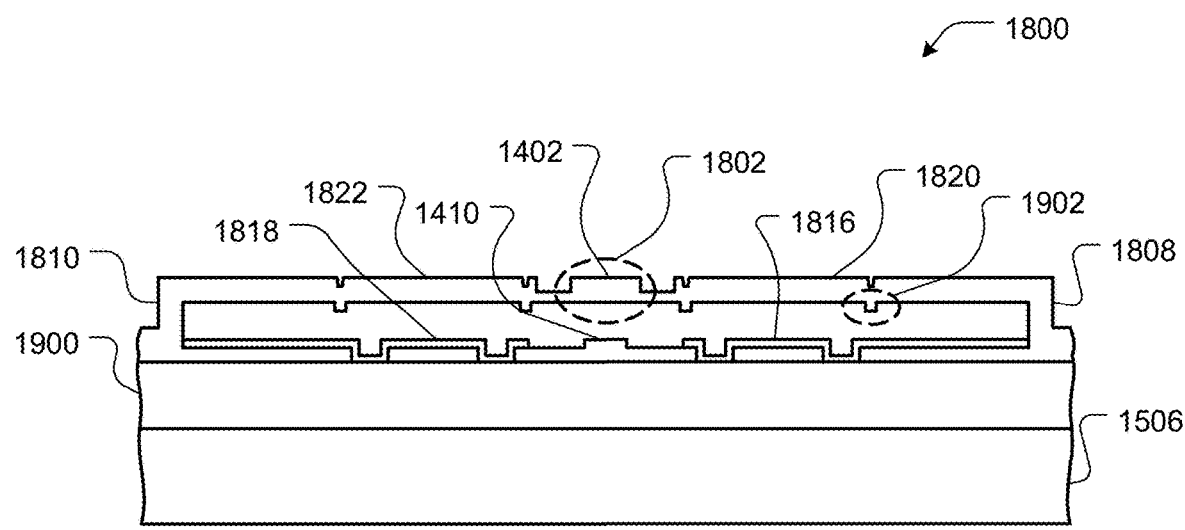
Figure 12:
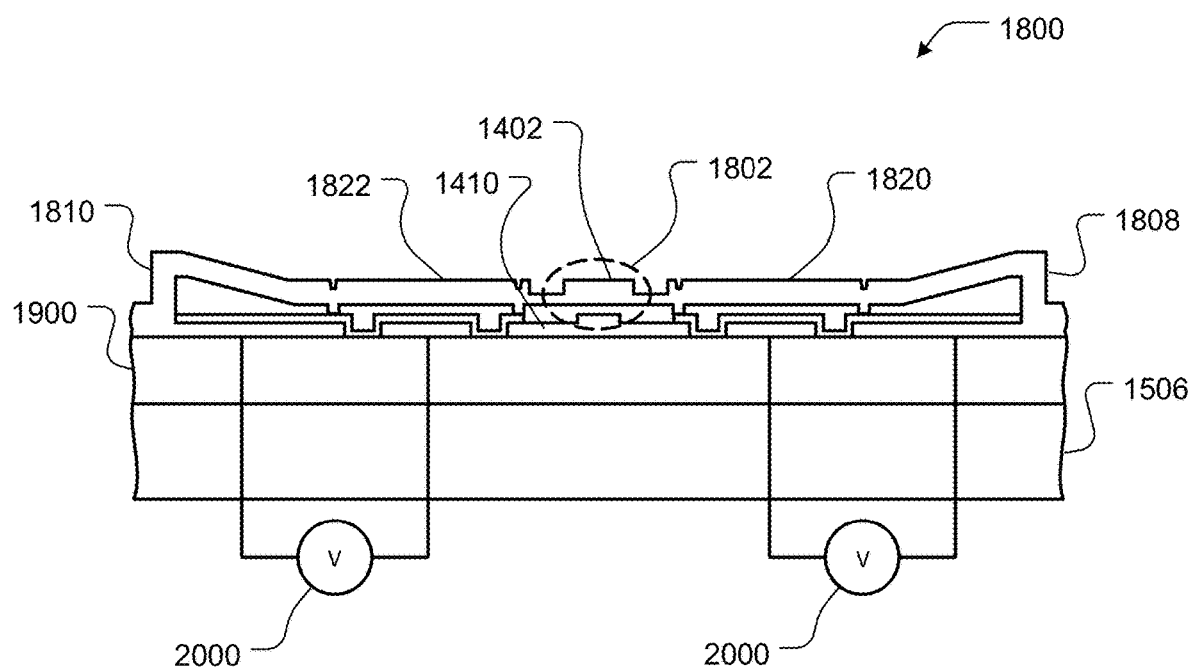
FIG. 12 is a schematic perspective side view of the optical switch of FIGS. 6-9 in the ON position, according to an embodiment of the present invention.

As discussed with respect to FIGS. 6-9, each second optical switch 1228-1242 may include a MEMS structure that is configured to selectively translate the translatable optical grating 1402 to the ON position and to the OFF position. FIGS. 10 and 11 are respective perspective and side views of the optical switch 1400 in the OFF position, showing an electrostatic MEMS structure 1800 configured to selectively translate the translatable optical grating 1400 to the ON position and to the OFF position. FIG. 12 is a partially schematic side view of the optical switch 1400 in the ON position. The translatable optical grating 1402 is shown within a dashed ellipse 1802.

The translatable optical grating 1402 is part of a bridge 1804. The bridge 1804 is spaced apart from, and disposed above, the substrate 1506. The substrate 1506 may include a buried oxide layer 1900 (FIGS. 11 and 12). The bridge 1804 is supported by respective piers 1808 and 1810. The second optical waveguide 1410 is disposed in or on the substrate 1506 under the translatable optical grating 1402.

The bridge 1804 includes two first electrostatic actuation electrodes 1812 and 1814. Two corresponding second electrostatic actuation electrodes 1816 and 1818 are disposed on the substrate 1506, such that the two first actuation electrodes 1812 and 1814 register over the two second actuation electrodes 1816 and 1818, respectively. The bridge 1804 also includes two flexures 1820 and 1822.

Thus, if an electric potential 2000 is applied across the first and second actuation electrodes 1812-1814 and 1816-1818, as shown schematically in FIG. 12, a resulting electrostatic force urges the first actuation electrodes 1812-1814 and the translatable optical grating 1402 toward the substrate 1506, thereby bringing the translatable optical grating 1402 within an appropriate distance of the second optical waveguide 1410 to turn the optical switch 1400 ON. Absent such an electric potential and the resulting electrostatic force, the flexures 1820 and 1822 return the translatable optical grating 1402 to the OFF position. A boss 1902 (FIG. 11) may be included to limit travel distance of the translatable optical grating 1402 in the ON position. Other aspects of the MEMS structure 1800 are similar to MEMS structures described in Seok and Seok supplement.

Figure 13:
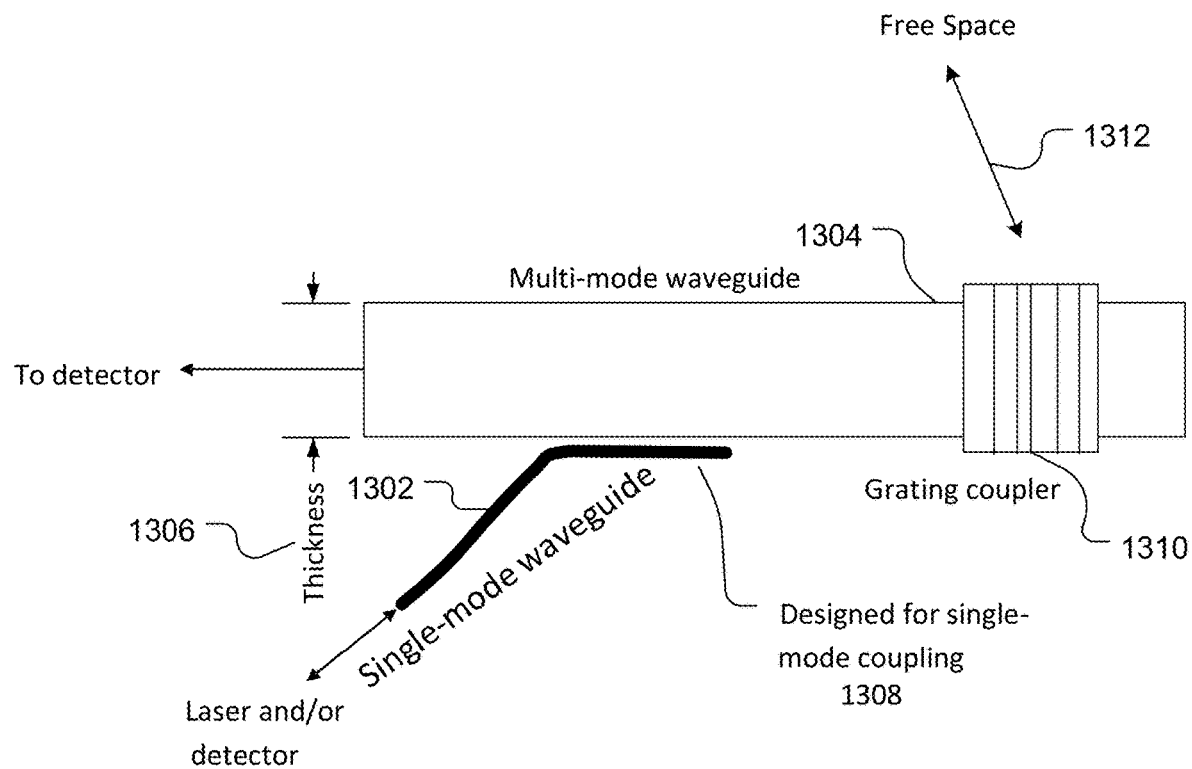
FIG. 13 is a partially schematic illustration of a multi-mode waveguide, grating coupler to free space and a laser coupled to the multi-mode waveguide by a single-mode waveguide, all part of a LiDAR system, according to an embodiment of the present invention.

A first configuration we will discuss is monostatic, in the sense that the same grating serves as both an outcoupler, which takes light from a photonic chip into free space, and an incoupler, which takes light from free space into the chip. The larger system is similar to our previous system, described above. Relevant sub-components are shown in FIG. 13.

A laser (not shown) shines light into a waveguide 1302, which in most cases is single-mode. Light from this waveguide 1302 then couples into a multi-mode waveguide 1304, i.e. a waveguide that is sufficiently wide and/or thick (as indicated at 1306 in FIG. 13) and/or sufficiently high-index that it can carry light of a single frequency in a large number (perhaps 5-100) of propagating modes, via a single-mode-multi-mode junction 1308. One or more waveguide-to-free-space grating couplers (only one waveguide-to-free-space grating coupler 1310 is shown for simplicity) are optically connected to this multi-mode waveguide 1304. A detector (not shown) is also connected to the multi-mode waveguide. The laser discussed with respect to FIG. 13 may be the transmitter 114 discussed with respect to FIG. 1, and the detector discussed with respect to FIG. 13 may be the receiver 112 discussed with respect to FIG. 1.

Thus, light coming from the far-field scene may couple into several different waveguide modes, and most of these modes will go into the detector. A double-headed arrow 1312 represents light coupled by the grating 1310 into and/or out of free space. Although the double-headed arrow 1312 is shown at an angle to the multi-mode waveguide 1304 and grating coupler 1310, the double-headed arrow 1312 extends out of the plane of the drawing. In some embodiments, there may additionally (optionally) be a detector attached to the single-mode waveguide 1302, as described in our previous patent applications, to further increase light detection. In some embodiments, the detector may be the same as the detector indicated on the multi-mode waveguide 1304. The optical switching network described with respect to FIGS. 1-12 may be used between the laser and the grating coupler 1310 of FIG. 13.

Figure 14:
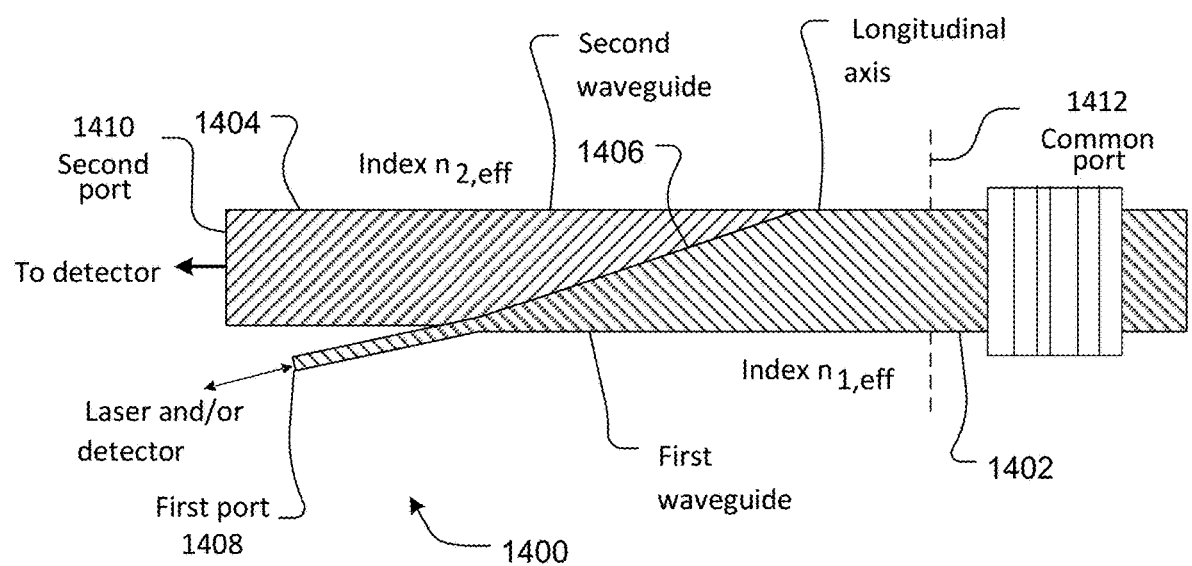
FIG. 14 is a partially schematic illustration of a single-mode-multi-mode optical junction that may be included in the LiDAR system of FIG. 13, according to an embodiment of the present invention.

FIG. 14 partially schematically illustrates one embodiment of the single-mode-multi-mode junction 1400. In this embodiment, there are two types of waveguides 1402 and 1404 with different effective indices of refraction $n_{1,\mathit{eff}} > n_{2,\mathit{eff}}$, which could be implemented by using different materials and/or different thicknesses. A diagonal boundary 1406 acts as a taper for the light from the laser, enabling that light to reliably enter the fundamental mode of the multi-mode waveguide 1304. However, if the index difference ($n_{1,\mathit{eff}} - n_{2,\mathit{eff}}$) is sufficiently small, light traveling leftward in the other modes, i.e., besides the fundamental mode, will pass through the boundary 1406 and continue leftward into the detector.

The junction 1400 in FIG. 14 provides predictability of the location of the laser light in the multi-mode waveguide 1304, because the laser light spreads, making an adiabatic transition, as it enters the multi-mode waveguide 1304, thereby remaining in the fundamental mode. Furthermore, a tapered junction is relatively tolerant to fabrication errors.

A narrow portion of the first waveguide 1402, extending away from the longitudinal axis of the first waveguide 1402, forms a first optical port 1408. One end of the second waveguide 1404 forms a second optical port 1410. An arbitrary cross-sectional portion of the first waveguide 1402, sufficiently far from the taper, such that the light from the laser has spread into the multi-mode second waveguide, can be considered a common optical port 1412.

Figure 15:
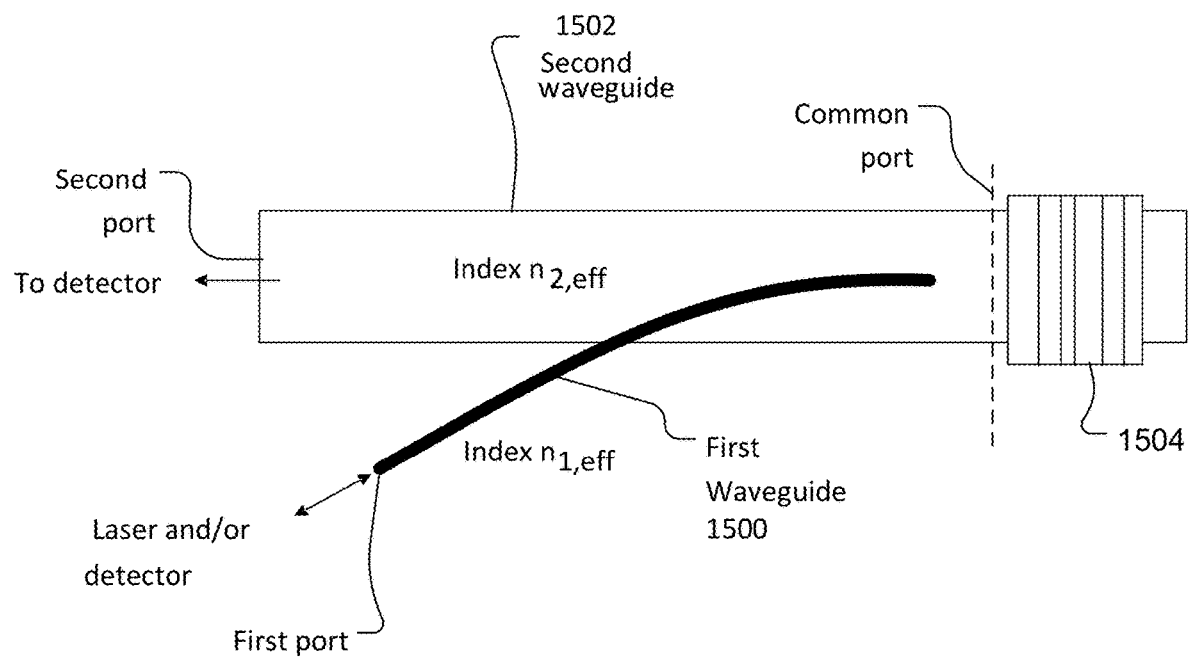
FIG. 15 is a partially schematic illustration of an alternative single-mode-multi-mode optical junction that may be included in the LiDAR system of FIG. 13, according to an embodiment of the present invention.

FIG. 15 partially schematically illustrates details of an alternative way the single-mode-multi-mode junction 1308 may be made. Here the goal is not to put the laser light into the fundamental mode of the multi-mode waveguide 1304, as in FIG. 14, but rather to put the laser light into a more confined mode. In some embodiments, in a more confined mode, the mode cross section is smaller. In such embodiments, the mode cross section on the outgoing path may be smaller than the multi-mode waveguide 1304 cross section.

Therefore, a higher-index waveguide 1500 is geometrically disposed within the bounds of a larger lower-index waveguide 1502, with different effective indices $n_{1,eff} > n_{2,eff}$, as above. In some embodiments, the higher-index waveguide 1500 may be a single-mode waveguide. In some embodiments, the output coupling portion of the grating 1504 may be designed according to the modes that the outgoing laser light couples into. The light from the laser enters the higher-index waveguide 1500 from the outside, either using a curved structure 1506, as shown, or an out-of-plane "overpass" waveguide (possibly switchable via MEMS technology) as in Seok, et al., "Large-scale broadband digital silicon photonic switches with vertical adiabatic couplers," Optica 3, 64 (2016), the entire contents of which are hereby incorporated by reference herein, for all purposes.

Figure 16:
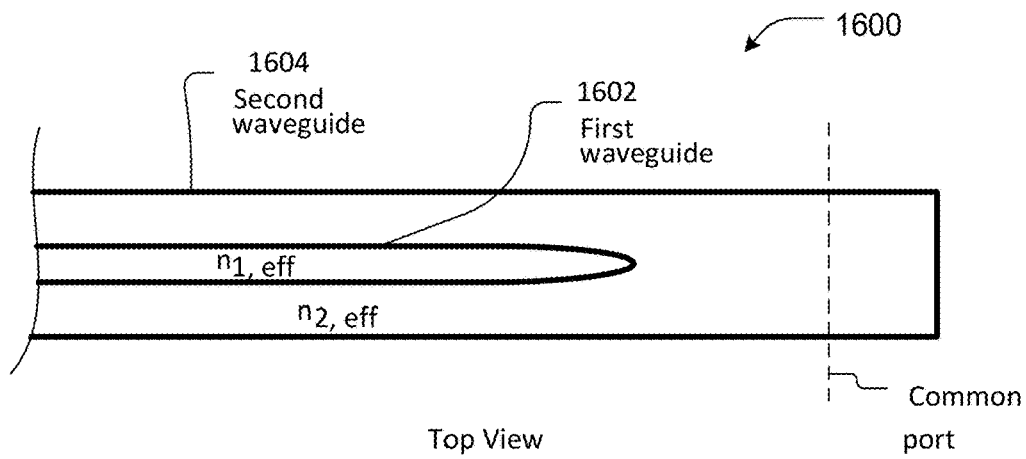
FIGS. 16 and 17 are respective top and side view partially schematic illustrations of another alternative single-mode-multi-mode optical junction that may be included in the LiDAR system of FIG. 13, according to an embodiment of the present invention.
Figure 17:
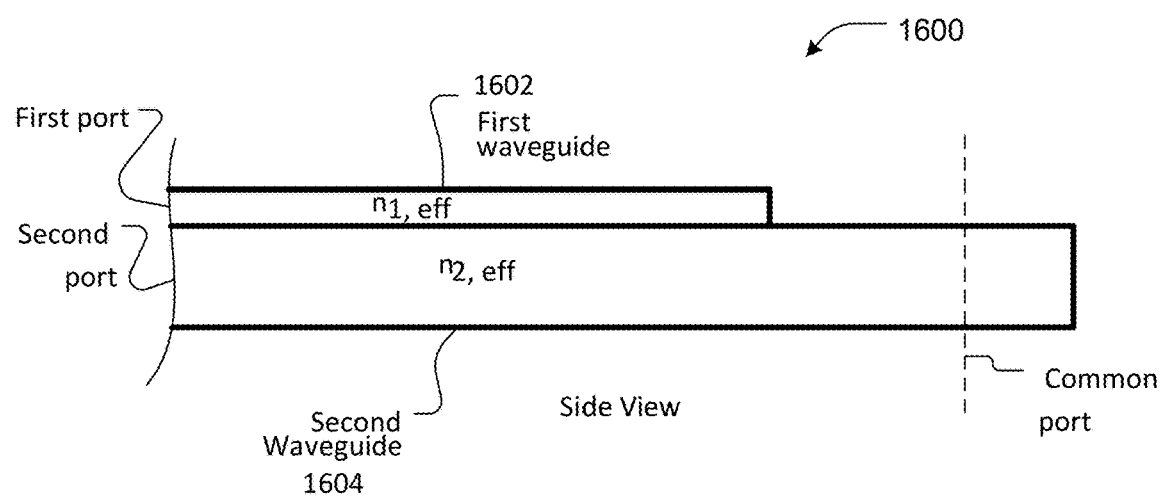

FIGS. 16 and 17 partially schematically illustrate respective top and side views of an alternative structure for the single-mode-multi-mode junction 1600. In the alternative structure 1600, a higher-index waveguide 1602 is geometrically disposed on top of a larger lower-index waveguide 1604, with different effective indices $n_{1,eff} > n_{2,eff}$, as above. In yet another alternative structure (not shown), the higher-index waveguide is geometrically disposed below a larger lower-index waveguide, with different effective indices $n_{1,eff} > n_{2,eff}$, as above. The choice of imbedding the higher-index waveguide 1506, as shown in FIG. 15, or disposing the higher-index waveguide 1602 on top of or on the bottom of the larger lower-index waveguide 1604, as shown in FIGS. 16 and 17, may be influenced by ease of fabrication.

Figure 18:
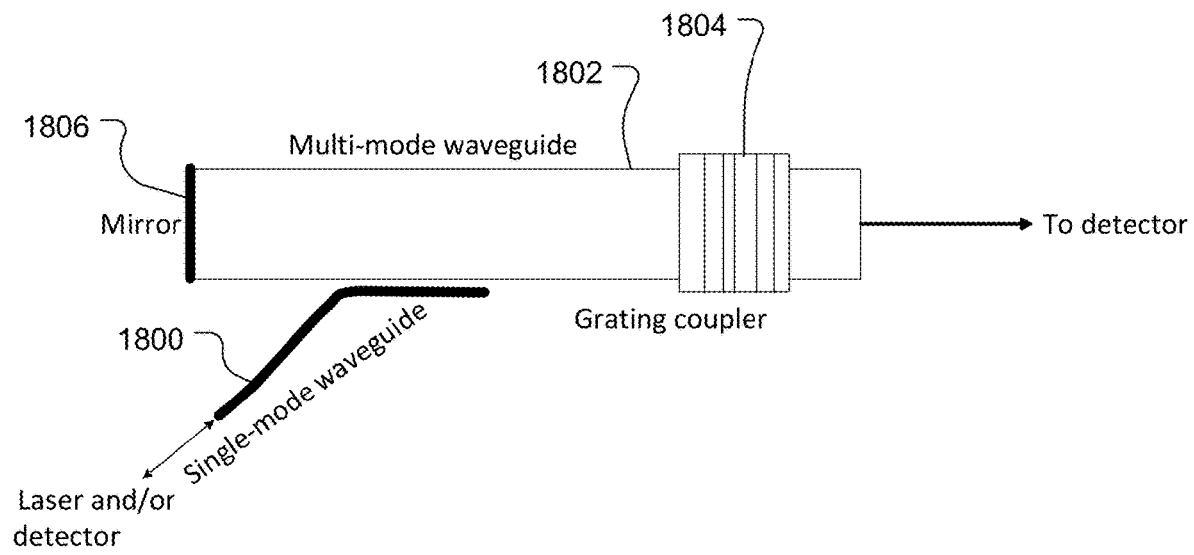
FIG. 18 is a partially schematic illustration of a multi-mode waveguide, grating coupler to free space, a laser coupled to the multi-mode waveguide by a single-mode waveguide and a mirror to reflect incoming optical signals, all part of a LiDAR system, according to an embodiment of the present invention.

FIG. 18 partially schematically illustrates yet another possibility, which could be combined with any of the previous approaches. As shown in FIG. 18, a laser is illustrated (leftmost). Also as show in FIG. 18, similarly to FIG. 13, one or two detectors may be used. In some embodiments, there may additionally (optionally) be a detector attached to the single-mode waveguide 1800, to further increase light detection. In some embodiments, the detector may be the same as the detector indicated on the multi-mode waveguide 1802. As illustrated in FIG. 18, in some embodiments, a first (required) detector is placed rightward from the grating coupler 1804, if the original laser light is traveling rightward. In some embodiments, as shown in FIG. 18, a second (optional) detector may be placed leftward along with the laser from the single-mode waveguide 1800. The second detector may be coupled to the laser. The second detector may be coupled to or have a detector port.

The grating could be designed such that the left half of the grating 1804 is an effective coupler for rightward-traveling waveguide light, and the right half of the grating 1804 is an effective coupler for leftward-traveling waveguide light. Then, some of the return light will impinge on the right half of the grating 1804, and pass through to the detector. On the left side of the multi-mode waveguide 1802 there may be a mirror 1806, as shown, enabling some non-zero fraction of leftward-traveling light to bounce rightward, pass through the grating coupler 1804, and reach the same detector. This embodiment avoids overpass waveguides, but may experience some light loss due to the reflection from the mirror 1806.

Figure 19:
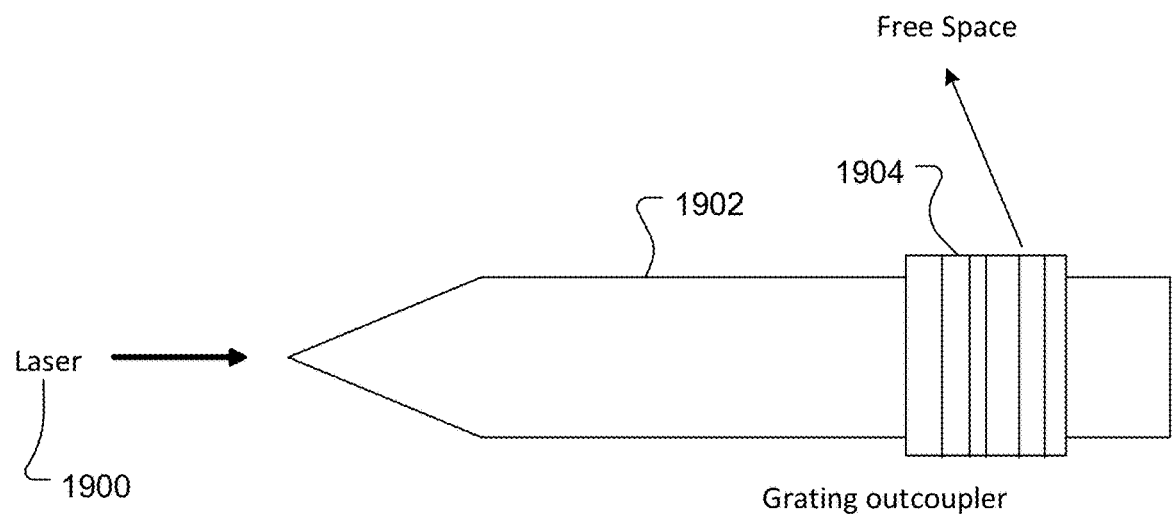
FIGS. 19 and 20 are partially schematic illustrations of components of a bistatic LiDAR system, according to an embodiment of the present invention.
Figure 20:
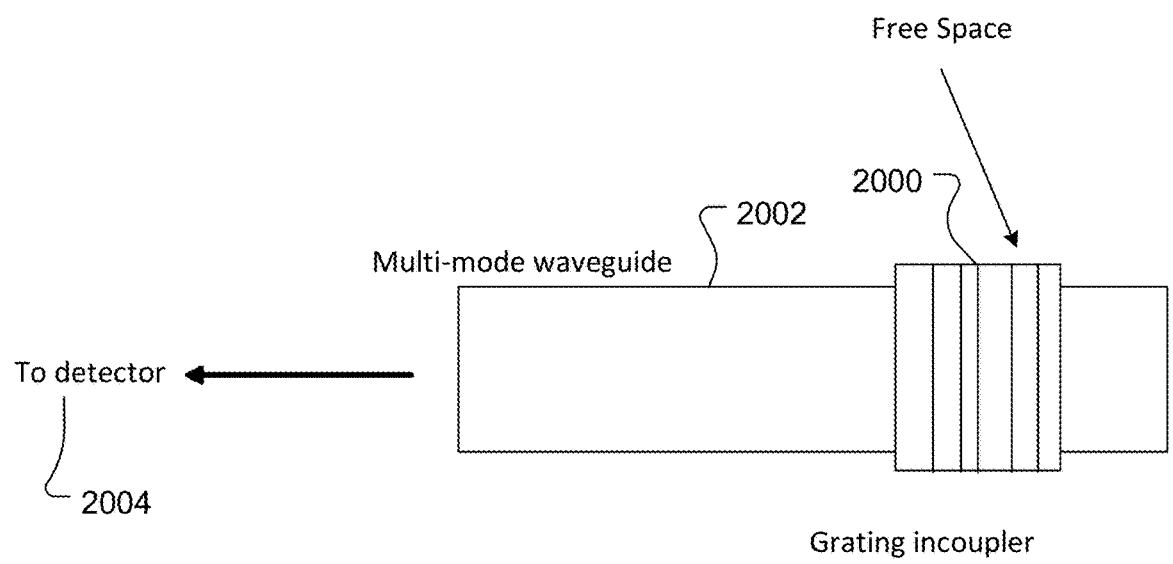

The second configuration we discuss is bistatic, where the emission and detection occur in different places, either separate chips, or separate proximate waveguides on the same chip. FIGS. 19 and 20 partially schematically illustrates a few components from an exemplary configuration. FIG. 19 shows a place where emission occurs, including a laser 1900, a waveguide 1902 (perhaps tapered) designed to convey and shape a single outgoing mode and an outcoupling grating 1904.

FIG. 20 shows a place where detection occurs, including an incoupling grating 2000, a multi-mode waveguide 2002 and a detector 2004. As in the other figures, other gratings, waveguides, lasers, an optical switching network and detectors are likely to be on the same chip, but are not shown for simplicity. Separate lenses (not shown) may be used to transmit and receive light into and from the scene. In all these cases, the multi-mode detection waveguide 2002 may be especially thick, and much thicker than typical waveguides, such as about 10 microns thick.

Alternatively, an entire silicon substrate may be used as a waveguide, with deep trenches filled with air or silicon oxide to optically isolate different rows. While the term "waveguide" is used in the previous sentence, these types of structures are much larger than the wavelength of light and are more commonly called total internal reflection (TIR)-based light pipes or similar terms.

As an alternative to setting $n_{1,eff} > n_{2,eff}$ in FIG. 14 or 15, they could have the same effective index, or even $n_{2,eff} > n_{1,eff}$, if there is a lower-index gap separating the smaller waveguide from the bigger one. Then, the light from the laser will be in a leaky mode, but sufficiently low leakage is acceptable. We expect that, in practice, it would be more practical to use $n_{1,eff} > n_{2,eff}$.

Some LiDAR designs collect light into 2D area detectors, and thus implicitly benefit from highly multi-modal collection. Multi-mode collection is a somewhat new issue that arises in the context of waveguide-based designs like ours.

Some embodiments trade off increased noise for increased received reflected light signal. For example, being receptive to modes of light other than, or in addition to, the mode of the transmitted light makes a LiDAR system susceptible to receiving stray light (noise) from the scene, such as sun light. LiDAR systems that are receptive to only the same mode of received light as the transmitted light can more easily reject this kind of noise. Embodiments, as described herein, are receptive to modes of light different from, or in addition to, the modes they transmit. Therefore, these embodiments may be subject to receiving such noise. However, this noise is more than compensated for by the increased reflected signal strength received by these embodiments.

Any of the multi-mode optical waveguides, such as multi-mode waveguide 1304, 1802 or 2002, described with respect to FIGS. 13-20 may be used as any of the second optical waveguides 1208-1216 discussed with respect to FIG. 4, and an array of optical emitters may be optically coupled to, and disposed along, any of the multi-mode optical waveguides, as discussed with respect to FIG. 4. Similarly, an objective lens may optically couple each optical emitter of the array of optical emitters to a respective unique portion of the field of view, as discussed with respect to FIG. 4. A LiDAR system may include an optical switching network coupled, via the single-mode optical waveguide and the single-mode-multi-mode optical junction, between the laser and the multi-mode optical waveguide, for example as discussed with respect to the optical switch network 104. As shown in FIG. 1, a controller 118 may be coupled to the optical switching network 104 and configured to cause the optical switching network 104 to route light from the laser 114 to a sequence of optical emitters of the array of optical emitters according to a temporal pattern. An optical receiver 112 may be coupled to the optical switching network 104 and configured to receive light reflected from the field of view.

The single-mode optical waveguide, for example single-mode optical waveguide 1302, 1500 or 1800, the single-mode-multi-mode optical junction, for example single-mode-multi-mode optical junction 1308, 1400 or 1600, the multi-mode optical waveguide, for example multi-mode optical waveguide 1304, 1802 or 2002, and the array of optical emitters are configured to emit into free space light of a single mode from each optical emitter of the array of optical emitters, for example optical emitters (grating couplers) 1310 or 1504. The multi-mode optical waveguide and the array of optical emitters are configured to receive from the free space, by each optical emitter of the array of optical emitters, light of a mode different from the single mode and couple the light of the different mode into the multi-mode optical waveguide.

As used herein, "optical coupler" means an optical antenna or other interface device between optical signals traveling in free space and optical signals traveling in a waveguide, such as an optical fiber or solid glass. In some embodiments, ports 200 discussed with reference to FIGS. 2 and 4 may be implemented with optical couplers. In embodiments where optical waveguides extend perpendicular to a desired direction of free-space propagation, an optical coupler should facilitate this change of direction. Examples of optical couplers include compact gratings, prisms fabricated in waveguides and facets etched in wafers and used as mirrors. An optical antenna is a device designed to efficiently convert free-propagating optical radiation to localized energy, and vice versa. Optical antennas are described by Palash Bharadwaj, et al., "Optical Antennas," Advances in Optics and Photonics 1.3 (2009), pp. 438-483, the entire contents of which are hereby incorporated by reference herein, for all purposes.

In some embodiments, the optical switch network 104 or 1200 may be implemented on a photonic chip, such as a silicon wafer. "Wafer" means a manufactured substrate, such as a silicon wafer. The surface of the earth, for example, does not fall within the meaning of wafer. The photonic chip provides a substrate, and the photonic chip may be fabricated to provide optical waveguides within a thickness of the substrate. The optical waveguides may be made of glass or another material that is optically transparent at wavelengths of interest. The optical waveguides may be solid or they may be hollow, such as a hollow defined by a bore in the thickness of the substrate, and partially evacuated or filled with gas, such as air or dry nitrogen. The optical waveguides may be defined by a difference in refractive index of the optical medium of the waveguides and refractive index of the substrate or other material surrounding the optical waveguides. The photonic chip may be fabricated using conventional semiconductor fabrication processes, such as the conventional CMOS process.

Depending on wavelength at which operation of the optical switch network 104 or 1200 is desired, an appropriate material should be used. For example, passive waveguides can be made of a variety of well-known materials, preferably silicon nitride, because of its compatibility with CMOS fabrication processes and high index contrast. Alternative materials for passive waveguides include doped silica or polymers. Active materials include GaN, AlN, and certain polymers.

As used herein, "light" means electromagnetic radiation having a wavelength between about 100 nm and about 1 mm.

While the invention is described through the above-described exemplary embodiments, modifications to, and variations of, the illustrated embodiments may be made without departing from the inventive concepts disclosed herein. For example, although specific parameter values, such as dimensions and materials, may be recited in relation to disclosed embodiments, within the scope of the invention, the values of all parameters may vary over wide ranges to suit different applications. Unless otherwise indicated in context, or would be understood by one of ordinary skill in the art, terms such as "about" mean within ±20%.

As used herein, including in the claims, the term "and/or," used in connection with a list of items, means one or more of the items in the list, i.e., at least one of the items in the list, but not necessarily all the items in the list. As used herein, including in the claims, the term "or," used in connection with a list of items, means one or more of the items in the list, i.e., at least one of the items in the list, but not necessarily all the items in the list. "Or" does not mean "exclusive or."

Although aspects of embodiments may be described with reference to flowcharts and/or block diagrams, functions, operations, decisions, etc. of all or a portion of each block, or a combination of blocks, may be combined, separated into separate operations or performed in other orders. References to a "module" are for convenience and not intended to limit its implementation. All or a portion of each block, module or combination thereof may be implemented as computer program instructions (such as software), hardware (such as combinatorial logic, Application Specific Integrated Circuits (ASICs), Field-Programmable Gate Arrays (FPGAs), processor or other hardware), firmware or combinations thereof.

A controller that causes operation of MEMS or other optical switches within a LiDAR to direct light to and from selected portions of the LiDAR's field of view, or portions thereof, may be implemented by one or more processors executing, or controlled by, instructions stored in a memory. Each processor may be a general purpose processor, such as a central processing unit (CPU), a graphic processing unit (GPU), digital signal processor (DSP), a special purpose processor, etc., as appropriate, or combination thereof.

The memory may be random access memory (RAM), read-only memory (ROM), flash memory or any other memory, or combination thereof, suitable for storing control software or other instructions and data. Instructions defining the functions of the present invention may be delivered to a processor in many forms, including, but not limited to, information permanently stored on tangible non-transitory non-writable storage media (e.g., read-only memory devices within a computer, such as ROM, or devices readable by a computer I/O attachment, such as CD-ROM or DVD disks), information alterably stored on tangible non-transitory writable storage media (e.g., floppy disks, removable flash memory and hard drives) or information conveyed to a computer through a communication medium, including wired or wireless computer networks. Moreover, while embodiments may be described in connection with various illustrative data structures, systems may be embodied using a variety of data structures.

Disclosed aspects, or portions thereof, may be combined in ways not listed above and/or not explicitly claimed. In addition, embodiments disclosed herein may be suitably practiced, absent any element that is not specifically disclosed herein. Accordingly, the invention should not be viewed as being limited to the disclosed embodiments.

What is claimed is:

1. A LiDAR system having a field of view, the LiDAR system comprising:
   a laser;
   a single-mode optical waveguide;
   a multi-mode optical waveguide;
   a single-mode-multi-mode optical junction;
   an array of optical emitters optically coupled to, and disposed along, the multi-mode optical waveguide;
   an objective lens optically coupling each optical emitter of the array of optical emitters to a respective unique portion of the field of view;
   an optical switching network coupled, via the single-mode optical waveguide and the single-mode-multi-mode optical junction, between the laser and the multi-mode optical waveguide;
   a controller coupled to the optical switching network and configured to cause the optical switching network to route light from the laser to a sequence of optical emitters of the array of optical emitters according to a temporal pattern; and
   an optical receiver coupled to the optical switching network and configured to receive light reflected from the field of view; wherein:
   the single-mode optical waveguide, the single-mode-multi-mode optical junction, the multi-mode optical waveguide and the array of optical emitters are configured to emit into free space light of a single mode from each optical emitter of the array of optical emitters; and
   the multi-mode optical waveguide and the array of optical emitters are configured to receive from the free space, by each optical emitter of the array of optical emitters, light of a mode different from the single mode and couple the light of the different mode into the multi-mode optical waveguide.

2. A LiDAR system according to claim 1, wherein the multi-mode optical waveguide and the array of optical emitters are configured to receive, by each optical emitter of the array of optical emitters, light of a plurality of modes, each different from the first mode, and couple the light of the plurality of modes into the multi-mode optical waveguide.

3. A LiDAR system according to claim 1, wherein the single-mode-multi-mode optical junction comprises:
   a first optical waveguide defining a first optical port and a common optical port, the first optical waveguide being capable of conducting multiple modes of light and having a first index of refraction; and
   a second optical waveguide defining a second optical port, the second optical waveguide being capable of conducting multiple modes of light and having a second index of refraction different from the first index of refraction; wherein:
   the first optical waveguide is optically coupled to the second optical waveguide along a diagonal boundary and is configured to adiabatically transition single-mode light entering the first optical port as the single-mode light spreads and enters the first optical waveguide toward the common optical port, such that the single-mode light remains in a fundamental mode.

4. A LiDAR system according to claim 1, wherein the single-mode-multi-mode optical junction comprises:
   a first single mode optical waveguide having a proximal end and a distal end, the proximal end defining a first optical port, the first optical waveguide having a first index of refraction; and
   a second optical waveguide having an outer boundary and defining a second optical port, the second optical waveguide being capable of conducting multiple modes of light and having a second index of refraction different from the first index of refraction; wherein:
   the proximal end of the first optical waveguide is disposed outside the outer boundary of the second optical waveguide and the distal end of the first optical waveguide is disposed within the outer boundary of the second optical waveguide.

5. A LiDAR system according to claim 1, wherein the single-mode-multi-mode optical junction comprises:
   a first single mode optical waveguide having a proximal end, a distal end and a first index of refraction, wherein the proximal end defines a first optical port and the distal end is tapered in width; and
   a second optical waveguide having an outer surface and defining a second optical port and a common optical port, wherein the second optical waveguide is capable of conducting multiple modes of light and has a second index of refraction different from the first index of refraction; wherein:
   a distal portion of the first optical waveguide is disposed on the outer surface of the second optical waveguide, between the second optical port and the common optical port, and contact area between the first optical waveguide and the second optical waveguide tapers in a narrowing manner toward the distal end of the first optical waveguide.

6. A LiDAR system according to any one of claim 3, wherein the first index of refraction is greater than the second index of refraction.

7. A LiDAR system according to claim 1, wherein:
   for each optical emitter of the array of optical emitters, a first portion of the optical emitter is configured to effectively optically couple light in the free space and light traveling in a first direction through the multi-mode optical waveguide, and second portion of the optical emitter is configured to effectively optically couple light in the free space and light traveling in a direction opposite the first direction through the multi-mode optical waveguide; the LiDAR system further comprising:
   a mirror optically coupled to the multi-mode optical waveguide and configured to reflect the light traveling in the first direction through the multi-mode optical waveguide toward the optical receiver.

8. A LiDAR system having a field of view, the LiDAR system comprising:
   a laser;
   a single-mode optical waveguide;
   a first array of optical emitters optically coupled to, and disposed along, the single-mode optical waveguide;
   a first objective lens optically coupling each optical emitter of the first array of optical emitters to a respective unique destination portion of the field of view;
   a first optical switching network optically coupled between the laser and the first array of optical emitters;
   a multi-mode optical waveguide;
   a second array of optical emitters optically coupled to, and disposed along, the multi-mode optical waveguide;
   a second objective lens optically coupling each optical emitter of the second array of optical emitters to a respective unique return portion of the field of view, each return portion of the field of view corresponding to a respective destination portion of the field of view;
   an optical receiver configured to receive light from the field of view;

a second optical switching network coupled between the second array of optical emitters and the optical receiver; and a controller coupled to the first and second optical switching networks and configured to cause the first optical switching network to route light from the laser to a sequence of optical emitters of the first array of optical emitters according to a temporal pattern and to cause the second optical switching network to route light from a sequence of optical emitters of the second array of optical emitters to the optical receiver according to the temporal pattern;

wherein:

the single-mode optical waveguide and the first array of optical emitters are configured to emit into free space light of a single mode from each optical emitter of the first array of optical emitters; and the multi-mode optical waveguide and the second array of optical emitters are configured to receive from the free space, by each optical emitter of the second array of optical emitters, light of a mode different from the single mode and couple the light of the different mode into the multi-mode optical waveguide.

9. A LiDAR system according to claim 8, wherein the multi-mode optical waveguide and the second array of optical emitters are configured to receive, by each optical emitter of the second array of optical emitters, light of a plurality of modes, each different from the single mode, and couple the light of the plurality of modes into the multi-mode optical waveguide.

10. A LiDAR system according to claim 8, wherein the first objective lens and the second objective lens are implemented by a single objective lens.

* * * * *